US006839949B1

(12) United States Patent
Miknich

(10) Patent No.: US 6,839,949 B1
(45) Date of Patent: Jan. 11, 2005

(54) ZIPPER REPAIR TOOL AND METHOD OF USE THEREFORE

(76) Inventor: Charles M. Miknich, 3600 Taiga Dr., Anchorage, AK (US) 99516

( * ) Notice: Subject to any disclaimer, the term of this patent is extended or adjusted under 35 U.S.C. 154(b) by 0 days.

(21) Appl. No.: 10/378,127

(22) Filed: Mar. 3, 2003

(51) Int. Cl.[7] .............................. B23P 6/00; B25B 7/02

(52) U.S. Cl. ............................... 29/402.19; 29/402.04; 29/402.05; 29/408; 29/410; 29/33.2; 29/34 A; 81/418; 81/424.5

(58) Field of Search ......................... 29/402.19, 402.01, 29/402.03, 402.04, 402.05, 408, 409, 410, 34 A, 33.2; 82/418, 419, 424.5; 81/426, 426.5, 418, 419, 424.5

(56) References Cited

U.S. PATENT DOCUMENTS 362,981 A * 5/1887 Leslie ........................... 7/127
376,220 A * 1/1888 Wood ......................... 294/118
393,494 A * 11/1888 Whipple ..................... 140/123
463,563 A * 11/1891 Williamson .................... 294/3
520,212 A * 5/1894 McKenzie .................. 294/118
717,526 A * 1/1903 Barney ........................ 81/302
749,110 A * 1/1904 Spangler ..................... 294/118
1,085,461 A * 1/1914 Michaelis .................... 81/419
1,299,103 A * 4/1919 Angle ........................... 433/4
1,442,486 A * 1/1923 Looke ...................... 72/409.19
1,484,100 A * 2/1924 Wertz ......................... 294/119
2,818,755 A * 1/1958 Henry ......................... 81/422
2,842,997 A 7/1958 Wentling ..................... 81/418
3,050,841 A 8/1962 Esselstyn ..................... 29/268
3,181,340 A 5/1965 Gruetzmacher .......... 72/409.01
3,218,696 A 11/1965 Dritz ........................... 29/770
3,461,713 A 8/1969 Donath .................... 72/409.01
3,847,037 A 11/1974 Fox ........................... 81/424.5
4,489,486 A 12/1984 Takahashi .................... 29/769
5,647,112 A 7/1997 Arvizu ........................ 29/268
6,082,167 A 7/2000 Lovas ..................... 72/409.18
6,327,944 B1 12/2001 Liao ............................ 81/418
6,336,387 B1 1/2002 Lee ............................. 81/415
2003/0233915 A1 * 12/2003 Takasaki .................... 81/424.5

* cited by examiner

*Primary Examiner*—Essama Omgba
(74) *Attorney, Agent, or Firm*—Michael J. Tavella

(57) ABSTRACT

A hand tool that has a pliers-like body and a special head. The head has a pair of parallel teeth that fit onto the grooves of a zipper guide. As the tool is squeezed, the teeth force the grooves closed uniformly and symmetrically. In this way, the tool can adjust the grooves on all types of zippers quickly and easily. Such a tool can be used on all types of zippers, such as those found on tents, clothing, tote bags, luggage and many other things.

2 Claims, 6 Drawing Sheets

ZIPPER REPAIR TOOL AND METHOD OF USE THEREFORE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to zipper repair tools and particularly to hand-held, pliers-like zipper repair tool.

2. Description of the Prior Art

Zippers have been used for well over 100 years. A typical zipper has a pair of strips that have teeth that are interlocked together in a guide as the guide passes over the teeth. The guide has a pair of grooves in which the teeth segments slide to facilitate interlocking. If the guide is damaged, the zipper will not work. Guides can be damaged, or if either side of the zipper guide is not symmetrical in relation to the other side, the zipper teeth will not properly mesh to ensure proper closure. For example, if the grooves are compressed to where the teeth can no longer enter the grooves, the zipper will not work. The more prevalent problem, however, is when the grooves are spread or distorted so that the teeth are no longer held in proper alignment within the grooves. Often, people may try to close the grooves using a tool like pliers to push the grooves closed. The problem with this approach is that it gives the user no control over the adjustment of the groove in relation to each other. It is easy to squeeze the groove too much on one side and thus completely distort the guide assembly. If the grooves are compressed too much, they must be opened again by prying them apart. Often this is done using a screwdriver or a similar tool. As before, there is no control on how much the grooves will be opened. Moreover, excessive force can cause the grooves to break. Finally, there is no simple way to ensure that the grooves are symmetrical and uniform using this technique. Thus, the job becomes a frustrating exercise in futility.

BRIEF DESCRIPTION OF THE INVENTION

The instant invention is a hand tool that has a pliers-like body and a special head. The head has a pair of parallel teeth that fit onto the lands above the grooves of a zipper guide. As the tool is squeezed, the jaws force the grooves lands down and closed uniformly and symmetrically. Appropriate pressure is applies to set the closure for the zipper teeth. In this way, the tool can work the groove lands on all types of zippers quickly and easily, such as those found on tents, clothing, tote bags, luggage and many other things.

DETAILED DESCRIPTION OF TH-IE INVENTION

Figure 1:
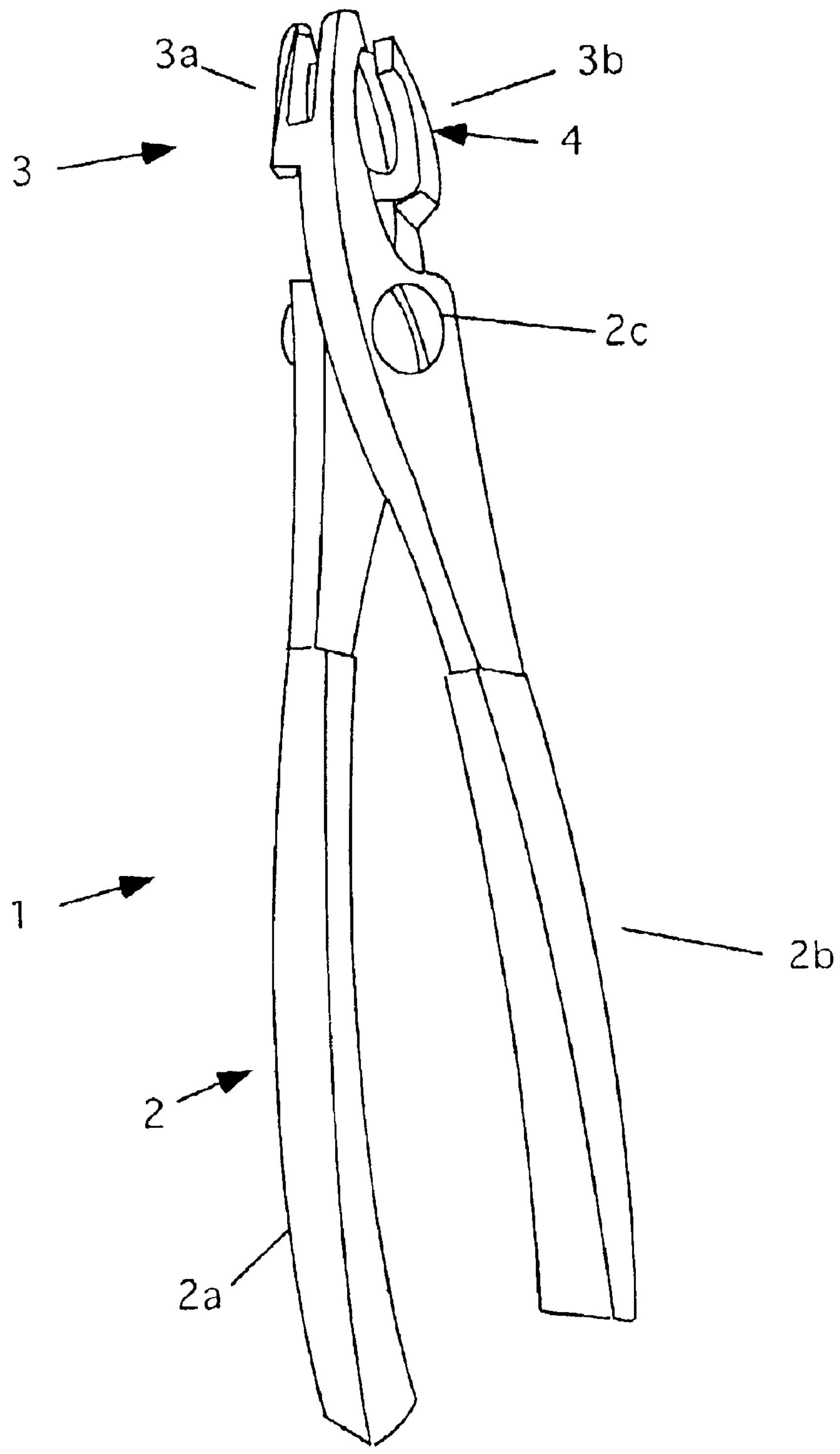
FIG. 1 is a left side perspective view of the invention.
Figure 2:
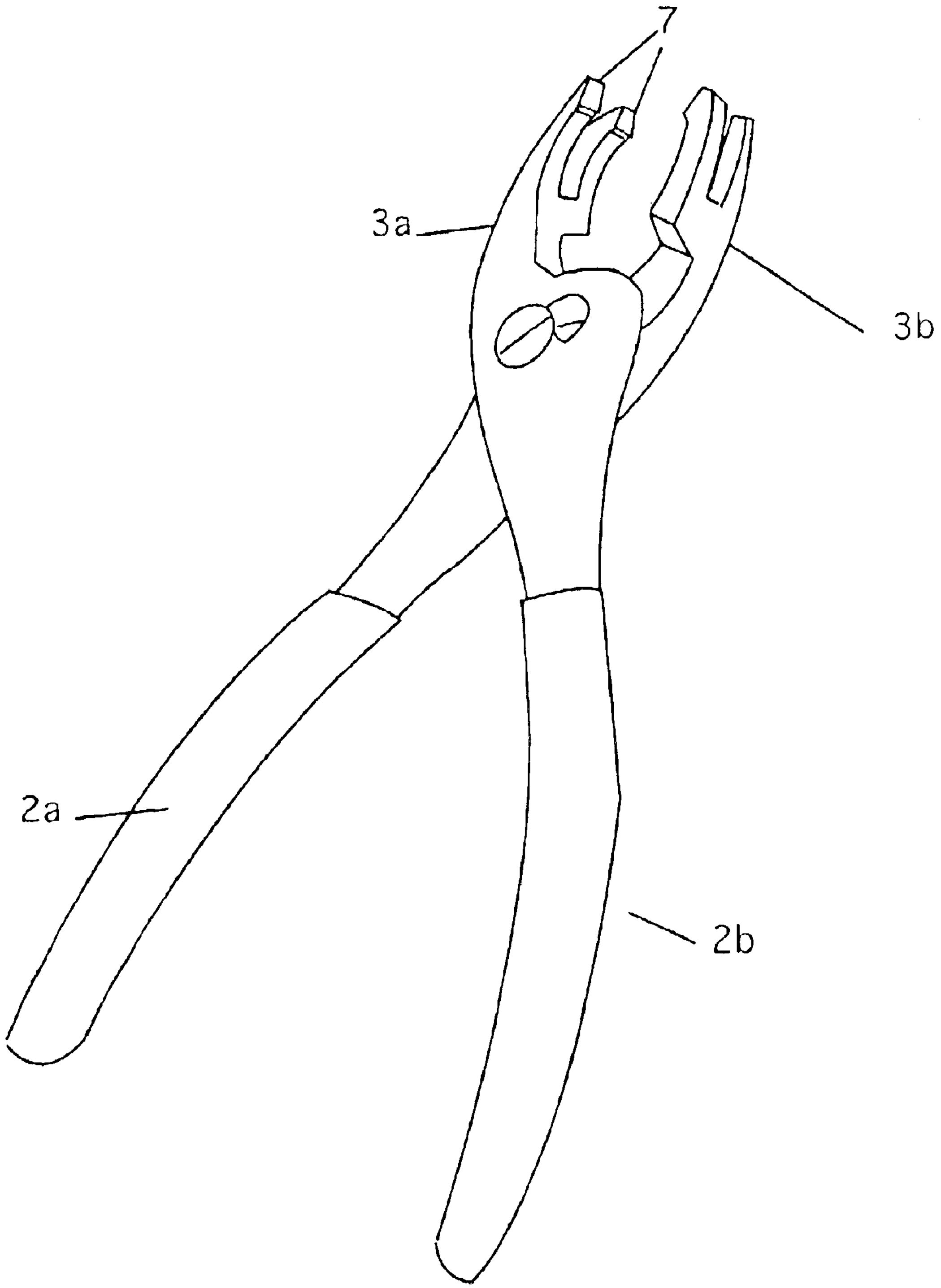
FIG. 2 is a right side perspective view of the invention showing the jaws open.
Figure 3:
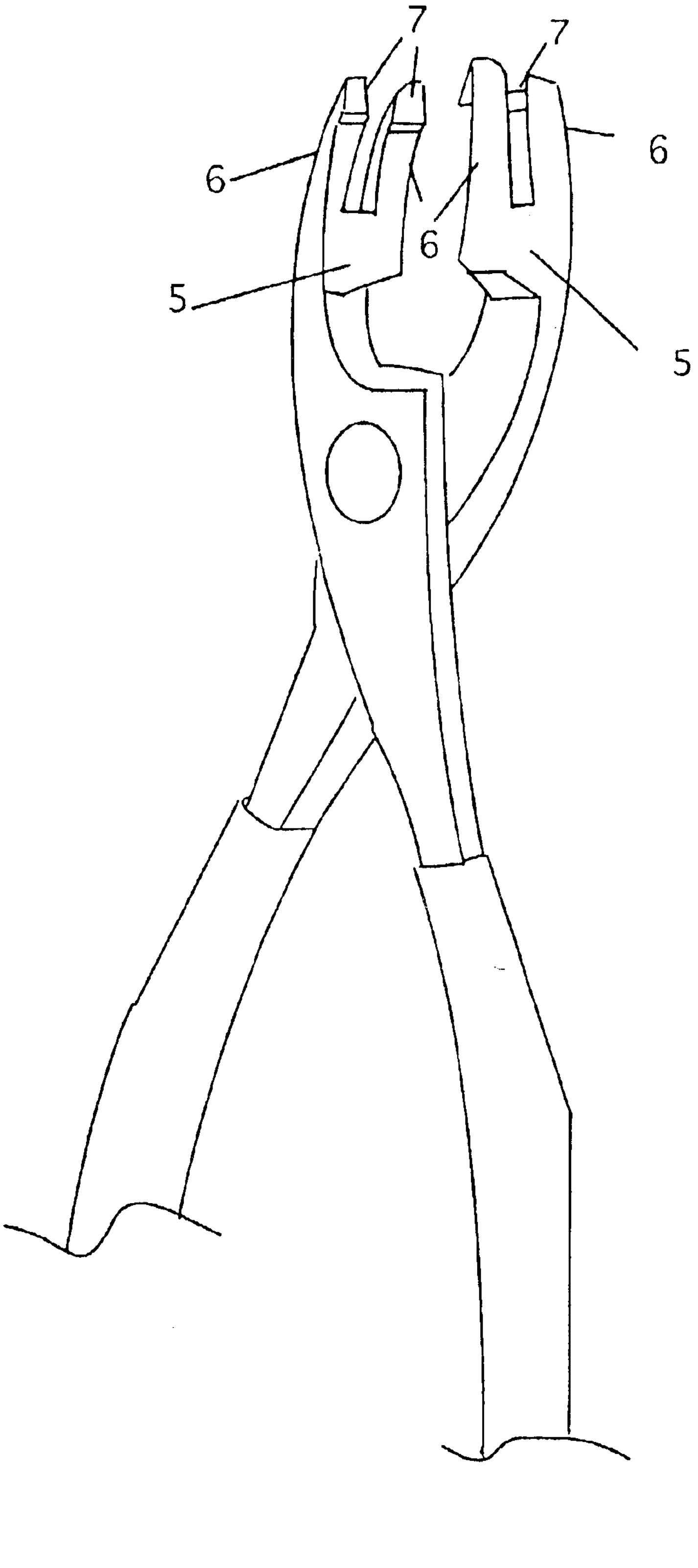
FIG. 3 is an enlarged right side perspective view of the invention showing the jaws open.

Referring now to FIGS. 1, 2 and 3, the invention 1 is a hand tool that has a pliers-like body 2 and a special head 3. The pliers-like body is formed of two handle portions **2*a* and 2*b* that are joined by a nut or rivet 2*c***. This type of construction is identical to that found in a pair of slip joint pliers, that are common to the art.

Figure 5:
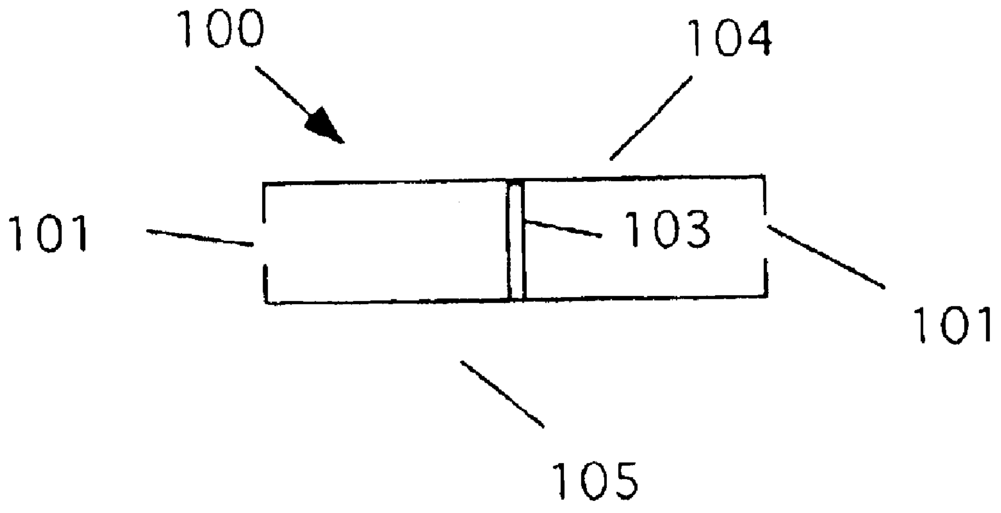
FIG. 5 is a front view of a sipper guide in a normal operating configuration.

Unlike a standard pair of pliers, which has a gripping head, the head 3 of the instant invention has a pair of parallel jaws 4 that are designed to fit onto the grooves 101 of a zipper guide (see FIG. 5). The head 3 has a right side **3*a* and a left side 3*b* that are formed on the top of the handles 2*a* and 2*b*** as shown.

Figure 4:
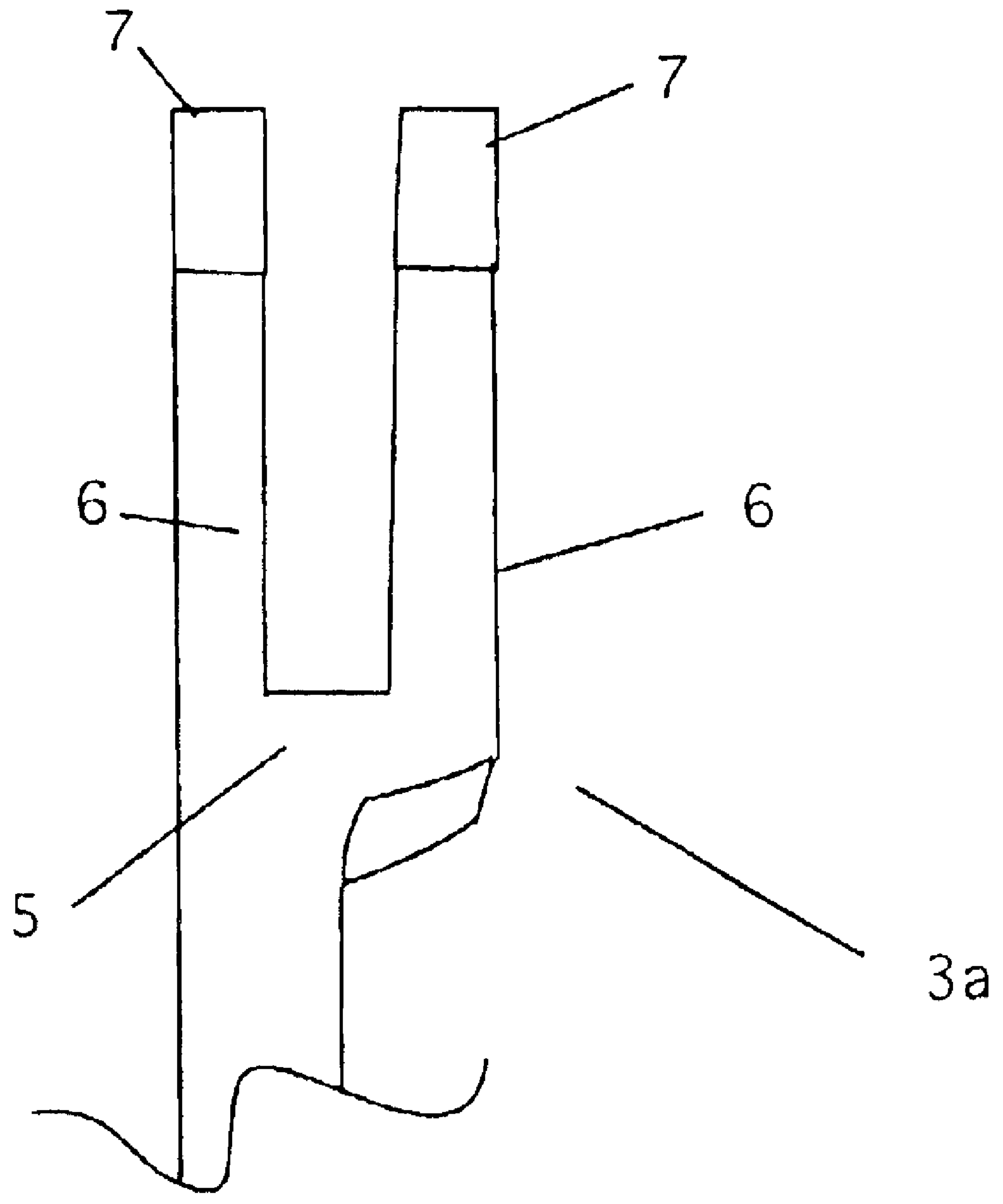
FIG. 4 is a front detail view of a jaw.

Referring now to FIGS. 3 and 4, details of the jaws 4 are shown. FIG. 3 shows each jaw 4 as having a base portion 5 and a bifurcated upper portion 6. The upper portion 6 is a pair of members that have an angled tip 7. The tip 7 is designed to fit over (or under) one of the grooves of the zipper guide, as discussed below.

Note that the heads 3 and jaws 4 of the device are parallel and symmetrical. This allows the user to fit the tool onto all sides of a damaged zipper guide simultaneously, which result in a repair made in one operation. This eliminates the need to adjust one side at a time. Moreover, it eliminates the problem of unbalanced adjustments, which require multiple adjustments to correct.

Figure 6:
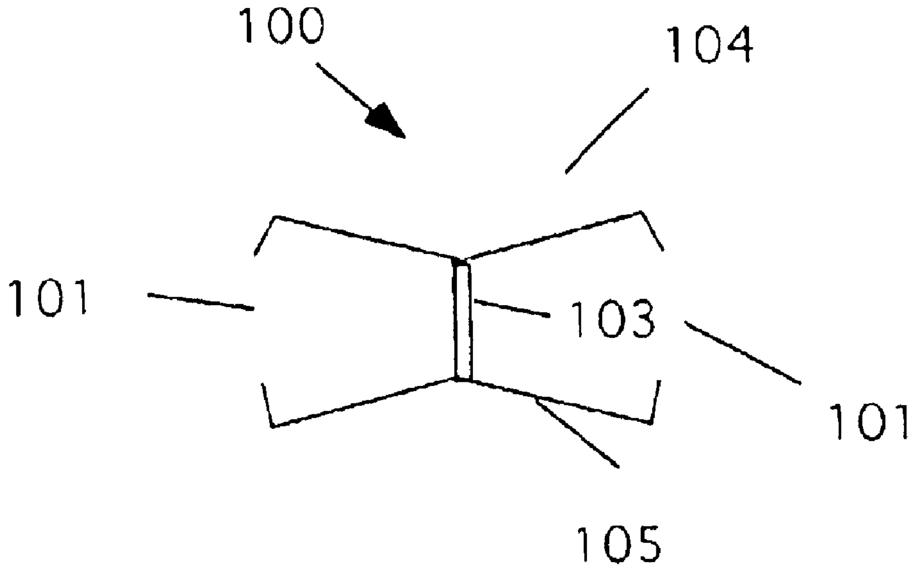
FIG. 6 is a front view of a sipper guide in a bent or defective configuration.

Referring now to FIGS. 5 and 6, an oversized view of a representative zipper guide 100 is shown. The zipper guide has two grooves 101, formed by joining a top portion 104 and a bottom portion 105 by a center web 103. FIG. 6 shows an oversized view of a damaged zipper. Here, the top and bottom portions have been forced apart, making the guide unusable. To correct this problem, people use tools such as pliers to squeeze the grooves closed. This procedure is clumsy at best. Closing the grooves by such means often results in unbalanced grooves. These must be reopened and then squeezed down again until the repair is complete. Occasionally, the use of such tools breaks the zipper guide, making it completely unusable.

Figure 7:
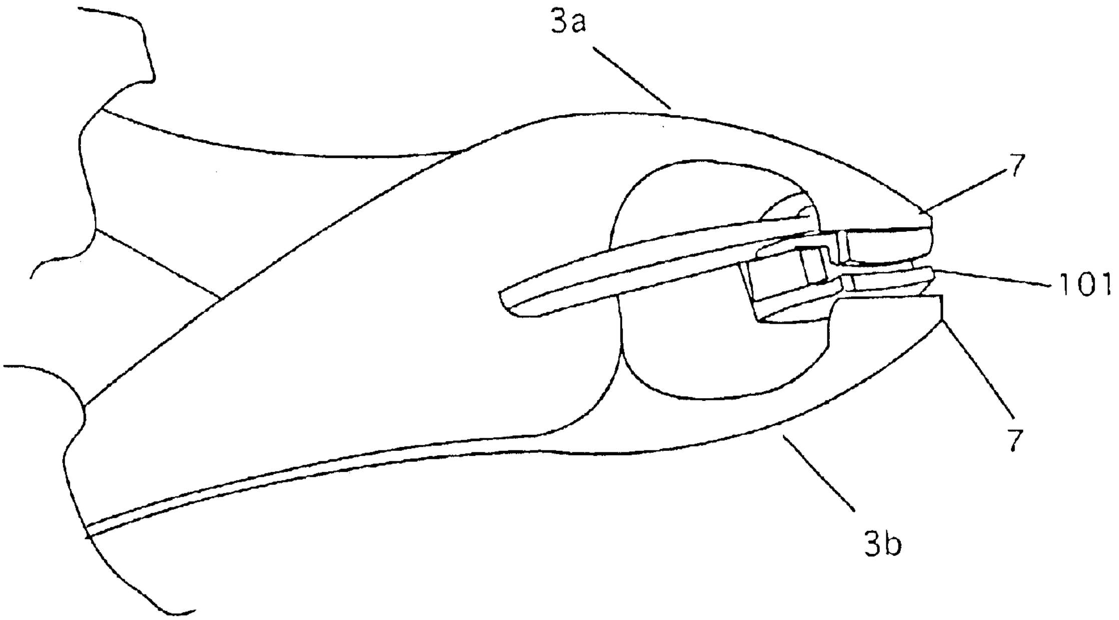
FIG. 7 is a detail view of the invention being applied to a zipper guide to repair the zipper guide.

FIG. 7 shows the tool in use. Here, the jaws 4 are placed such that the tips 7 align with the grooves 101. Note how the jaws 4 simultaneously fit against the top and bottom of both sides of the zipper guide 100. As the tool 1 is squeezed, the tips 7 force the grooves down uniformly and symmetrically. In this way, the tool can narrow the grooves on all types of zippers quickly and easily. Such a tool can be used on all types of zippers, such as those found on tents, clothing, tote bags, luggage and many other things The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A tool for repairing zippers comprising:

a) a pair of handles, rotatably attached about a pivot point; and b) a pair of jaws formed on said pair of symmetrical handles wherein each jaw has a first curved vertical member, extending upward from each handle of said pair of handles from the pivot point, a second curved vertical member attached midpoint to said first curved vertical member by a horizontal bridge member, the first and second curved vertical members being substantially parallel with the gap defined in-between, and further wherein said first and second curved vertical members have a flattened angled tip formed thereon.

2. A method of repairing a zipper using a tool having a pair of handles, rotatably attached about a pivot point, a pair of symmetrical jaws formed on said pair of handles wherein each jaw has a first curved vertical member, extending upward from each handle of said pair of handles from the pivot point, a second curved vertical member attached midpoint to said first curved vertical member by a horizontal bridge member, the first and second curved vertical members being substantially parallel with a gap defined in-between, and further wherein said first and second curved vertical members have a flattened angled tip formed thereon, comprising the steps of:

a) opening said pair of handles, thereby opening said pair of jaws;

b) placing a zipper guide between said pair of jaws, such that the flattened angled tip of each vertical member is adjacent to said zipper guide;

c) closing said pair of handles, thereby clamping said pair of jaws onto said zipper guide; and d) applying pressure to said pair of handles, thereby pressing said zipper guide between said pair of jaws, said pressure acting to close the spacing of said zipper guide.

* * * * *